United States Patent
Ikawa et al.

(10) Patent No.: US 9,291,471 B2
(45) Date of Patent: Mar. 22, 2016

(54) IN-VEHICLE INFORMATION PROCESSING DEVICE AND DRIVING ASSIST DEVICE

(75) Inventors: Masahiko Ikawa, Tokyo (JP); Yuji Igarashi, Tokyo (JP); Yuko Ota, Tokyo (JP); Takashi Irie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 13/502,604

(22) PCT Filed: Nov. 25, 2010

(86) PCT No.: PCT/JP2010/071013
§ 371 (c)(1),
(2), (4) Date: Apr. 18, 2012

(87) PCT Pub. No.: WO2011/068070
PCT Pub. Date: Jun. 9, 2011

(65) Prior Publication Data
US 2012/0209510 A1 Aug. 16, 2012

(30) Foreign Application Priority Data
Dec. 1, 2009 (JP) .................................. 2009-273202

(51) Int. Cl.
*G01C 21/34* (2006.01)
*G01G 1/08* (2006.01)

(52) U.S. Cl.
CPC .................................. *G01C 21/3492* (2013.01)

(58) Field of Classification Search
CPC .................................................. G01C 21/3492
See application file for complete search history.

(56) References Cited

U.S. PATENT DOCUMENTS

| 5,933,094 A | 8/1999 | Goss et al. |
| 6,868,331 B2 | 3/2005 | Hanebrink |
| 7,193,528 B2 | 3/2007 | Hanebrink |

(Continued)

FOREIGN PATENT DOCUMENTS

| CN | 1892722 A | 1/2007 |
| CN | 1952993 A | 4/2007 |

(Continued)

OTHER PUBLICATIONS

Office Action issued Apr. 9, 2013 in Japanese Patent Application No. 2011-544243 with partial English language translation.

(Continued)

*Primary Examiner* — Helal A Algahaim
*Assistant Examiner* — Charles J Han
(74) *Attorney, Agent, or Firm* — Oblon, McClelland, Maier & Neustadt, L.L.P.

(57) ABSTRACT

An in-vehicle information processing device capable of efficiently processing information by extracting an event that exists outside of a travel route but can possibly reach the travel route. The in-vehicle information processing device includes a map database, a traffic information database, a vehicle position determination mechanism, a driving assist information extraction mechanism for extracting driving assist information, and a driving assist information database for storing the driving assist information. An aid information extraction mechanism includes a travel route determination mechanism for determining a vehicle travel route based on a vehicle position. The driving assist information extraction mechanism extracts the driving assist information from map information and traffic information on the travel route.

8 Claims, 9 Drawing Sheets

(56) References Cited

U.S. PATENT DOCUMENTS

| | | | |
|---|---|---|---|
| 7,472,099 | B2 | 12/2008 | Nishiuma et al. |
| 7,617,041 | B2 | 11/2009 | Sera |
| 2002/0077741 | A1 | 6/2002 | Hanebrink |
| 2005/0162284 | A1 | 7/2005 | Hanebrink |
| 2007/0005230 | A1* | 1/2007 | Sera .............................. 701/117 |
| 2007/0203638 | A1 | 8/2007 | Tooyama et al. |
| 2008/0228389 | A1 | 9/2008 | Kano et al. |
| 2009/0018759 | A1 | 1/2009 | Endo et al. |
| 2009/0037093 | A1 | 2/2009 | Kurihara et al. |

FOREIGN PATENT DOCUMENTS

| | | |
|---|---|---|
| CN | 101523460 A | 9/2009 |
| DE | 195 16 477 A1 | 11/1996 |
| DE | 199 08 869 A1 | 9/2000 |
| DE | 102 30 832 A1 | 1/2004 |
| DE | 102 34 595 A1 | 2/2004 |
| DE | 11 2006 001 382 T5 | 4/2008 |
| EP | 1 111 338 A2 | 6/2001 |
| EP | 1 970 670 A1 | 9/2008 |
| JP | 9 270094 | 10/1997 |
| JP | 09270094 A * | 10/1997 |
| JP | 2000 18959 | 1/2000 |
| JP | 2001 229494 | 8/2001 |
| JP | 2003 281675 | 10/2003 |
| JP | 2004 226168 | 8/2004 |
| JP | 2004 280320 | 10/2004 |
| JP | 2006-214853 A | 8/2006 |
| JP | 2007 11558 | 1/2007 |
| JP | 2007 334574 | 12/2007 |
| JP | 4 177228 | 8/2008 |
| JP | 2008 233045 | 10/2008 |

OTHER PUBLICATIONS

Office Action issued on Jan. 16, 2013, in German patent Application No. 11 2010 004 633.6 with English translation.

Combined Chinese Office Action and Search Report issued Mar. 26, 2014, in Chinese Patent Application No. 201080052868.6 with Partial English translation of Office Action and English translation of Search Report.

Office Action issued Nov. 15, 2014, in Chinese Patent Application No. 201080052868.6 (with English-language Translation).

International Search Report Issued Mar. 1, 2011 in PCT/JP10/71013 Filed Nov. 25, 2010.

International Preliminary Report on Patentability Issued Jun. 5, 2012 in PCT/JP10/71013 Filed Nov. 25, 2010.

* cited by examiner

FIG. 3

| POSITION | TIME OF GENERATION | INFORMATION TYPE | INFORMATION CONTENT |
|---|---|---|---|
| 4900 | — | CURVE | MAGNITUDE OF CURVE:100R |
| 5100 | 2009/08/27 15:01:11:001 | TRAFFIC LIGHT | TURN RIGHT<br>STATE OF TRAFFIC LIGHT:BLUE<br>THE REMAINING NUMBER OF SECONDS:50 SECONDS |
| 5100 | 2009/08/27 15:01:11:001 | ONCOMING VEHICLE | DISTANCE TO NODE:100m<br>SPEED:30km/h |

IN-VEHICLE INFORMATION PROCESSING DEVICE AND DRIVING ASSIST DEVICE

TECHNICAL FIELD

The present invention relates to an in-vehicle information processing device and a driving assist device, and particularly to an in-vehicle information processing device and a driving assist device for managing map information and traffic information.

BACKGROUND ART

Many types of devices have been proposed which perform various driving assists by using data stored as map information as information concerning a traveling route located forward of a vehicle. However, the map information necessary for these driving assists is stored in an HDD or a DVD-ROM, and there is a large amount of the information. Therefore, in a case where a driving assist application has to read out the map information, a relatively large delay may be caused. Since the above-mentioned driving assist application is required to have the real-time property, a system allowing an efficient use of the driving assist information is necessary.

As a technique for efficiently processing such a large amount of digital data, Patent Document 1 proposes a method. In this technique, a travelable route is calculated based on a current position of a vehicle, and information concerning a map on the route is extracted and stored as information of a point on the route, and additionally the stored data is continuously updated in accordance with traveling of the vehicle, to thereby allow a relatively large amount of digital map data to be efficiently processed in an advanced driver aid application. The information on the travel route is in advance automatically extracted as common information common to all applications, and managed. Thus, it is not necessary to access a map database upon a request from the application. This makes it easy to ensure the real-time property required for the application.

If the application exists in an external device connected to a data bus in the vehicle, it is necessary to share the driving assist information via an in-vehicle LAN. In this method, delivered information is limited to information of a travelable route, and moreover is solely delivered as information that is common to all devices. This can minimize communication traffic, and thus ensure the real-time property in communications.

PRIOR-ART DOCUMENTS

Patent Documents

Patent Document 1: Japanese Patent Application Laid-Open No. 2001-229494

SUMMARY OF THE INVENTION

Problems to be Solved by the Invention

Information used in a vehicle driving assist application includes not only static information stored in the map database, but also dynamic information concerning an oncoming vehicle, a traffic congestion, and the like, that can be obtained via communication. However, in the method that handles only the static information as disclosed in the Patent Document 1, only the information on the vehicle's travelable route is extracted and managed. Therefore, information of something that can possibly move into the route in future though it is not the information on the travelable route at that point of time, such as information of an oncoming vehicle or the end of a traffic congestion located out of the travel route, cannot be extracted. Thus, there is a problem that not all information required for the application cannot be extracted. For example, there is a problem that information of an oncoming vehicle at a time of a right turn is not included in the information on the travel route because a travel route concerning such information is different from a road where an actual event is occurring.

The present invention has been made to solve the above-described problems, and an object of the present invention is to provide an in-vehicle information processing device capable of extracting an event that can possibly reach a travel route within a predetermined time period from events existing out of the travel route, and showing the event as information of an intersection point on the travel route, to thereby enable a large amount of data including dynamic information to be efficiently processed.

Means for Solving the Problems

An in-vehicle information processing device according to the present invention is an in-vehicle information processing device including: a map database for storing map information; a traffic information database for storing traffic information; vehicle position determination means for calculating and determining a vehicle position; driving assist information extraction means for extracting driving assist information from the map information stored in the map database and the traffic information stored in the traffic information database; and a driving assist information database for storing the driving assist information extracted by the driving assist information extraction means, wherein: the driving assist information extraction means includes travel route determination means for determining a vehicle travel route for the vehicle based on the vehicle position determined by the vehicle position determination means; and the driving assist information extraction means extracts the driving assist information from the map information and the traffic information on the vehicle travel route, and includes same event determination means for determining whether or not the map information and the traffic information express the same event; and if the same event determination means determines that the same event is expressed, the driving assist information extraction means extracts only the traffic information.

An in-vehicle information processing device according to the present invention is an in-vehicle information processing device including: a map database for storing map information; a traffic information database for storing traffic information; vehicle position determination means for calculating and determining a vehicle position; driving assist information extraction means for extracting driving assist information from the map information stored in the map database and the traffic information stored in the traffic information database; and a driving assist information database for storing the driving assist information extracted by the driving assist information extraction means, wherein: the driving assist information extraction means includes travel route determination means for determining a vehicle travel route for the vehicle based on the vehicle position determined by the vehicle position determination means; the driving assist information extraction means extracts the driving assist information from the map information and the traffic information on the vehicle travel route; the driving assist information extraction means includes out-of-route information extraction means for extracting, from the traffic information concerning the outside of the vehicle travel route which is connected to the vehicle travel route via a connection point, the traffic information concerning an event that can possibly reach the vehicle travel route within a predetermined time period, as the driving assist information in the connection point.

A driving assist device according to the present invention includes: a data reception section for receiving the driving assist information delivered from the driving assist information delivery means; a second information estimation section for estimating a change of the delivered driving assist information, and outputting an estimation result as second estimated driving assist information; and driving assist execution means for performing a driving assist having a predetermined content for aiding traveling of the vehicle, based on the second estimated driving assist information.

Effects of the Invention

The in-vehicle information processing device according to the present invention is an in-vehicle information processing device including: a map database for storing map information; a traffic information database for storing traffic information; vehicle position determination means for calculating and determining a vehicle position; driving assist information extraction means for extracting driving assist information from the map information stored in the map database and the traffic information stored in the traffic information database; and a driving assist information database for storing the driving assist information extracted by the driving assist information extraction means. The driving assist information extraction means includes travel route determination means for determining a vehicle travel route for the vehicle based on the vehicle position determined by the vehicle position determination means. The driving assist information extraction means extracts the driving assist information from the map information and the traffic information on the vehicle travel route, and includes same event determination means for determining whether or not the map information and the traffic information express the same event; and if the same event determination means determines that the same event is expressed, the driving assist information extraction means extracts only the traffic information. Thereby, the driving assist information can be appropriately extracted, and efficiently processed as information on the travel route.

The in-vehicle information processing device according to the present invention is an in-vehicle information processing device including: a map database for storing map information; a traffic information database for storing traffic information; vehicle position determination means for calculating and determining a vehicle position; driving assist information extraction means for extracting driving assist information from the map information stored in the map database and the traffic information stored in the traffic information database; and a driving assist information database for storing the driving assist information extracted by the driving assist information extraction means, wherein: the driving assist information extraction means includes travel route determination means for determining a vehicle travel route for the vehicle based on the vehicle position determined by the vehicle position determination means; the driving assist information extraction means extracts the driving assist information from the map information and the traffic information on the vehicle travel route; the driving assist information extraction means includes out-of-route information extraction means for extracting, from the traffic information concerning the outside of the vehicle travel route which is connected to the vehicle travel route via a connection point, the traffic information concerning an event that can possibly reach the vehicle travel route within a predetermined time period, as the driving assist information in the connection point. Thereby, the driving assist information can be appropriately extracted, and efficiently processed as information on the travel route.

The driving assist device according to the present invention includes: a data reception section for receiving the driving assist information delivered from driving assist information delivery means; a second information estimation section for estimating a change of the delivered driving assist information and outputting an estimation result as second estimated driving assist information; and driving assist execution means for performing a driving assist having a predetermined content for aiding traveling of the vehicle based on the second estimated driving assist information. This can reduce an opportunity of requiring the delivery of the driving assist information for performing a driving assist.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 An explanatory diagram showing a specific example of a driving assist information database of the in-vehicle information processing device according to the embodiment 1 of the present invention.

EMBODIMENT FOR CARRYING OUT THE INVENTION

A. Embodiment 1

Figure 1:
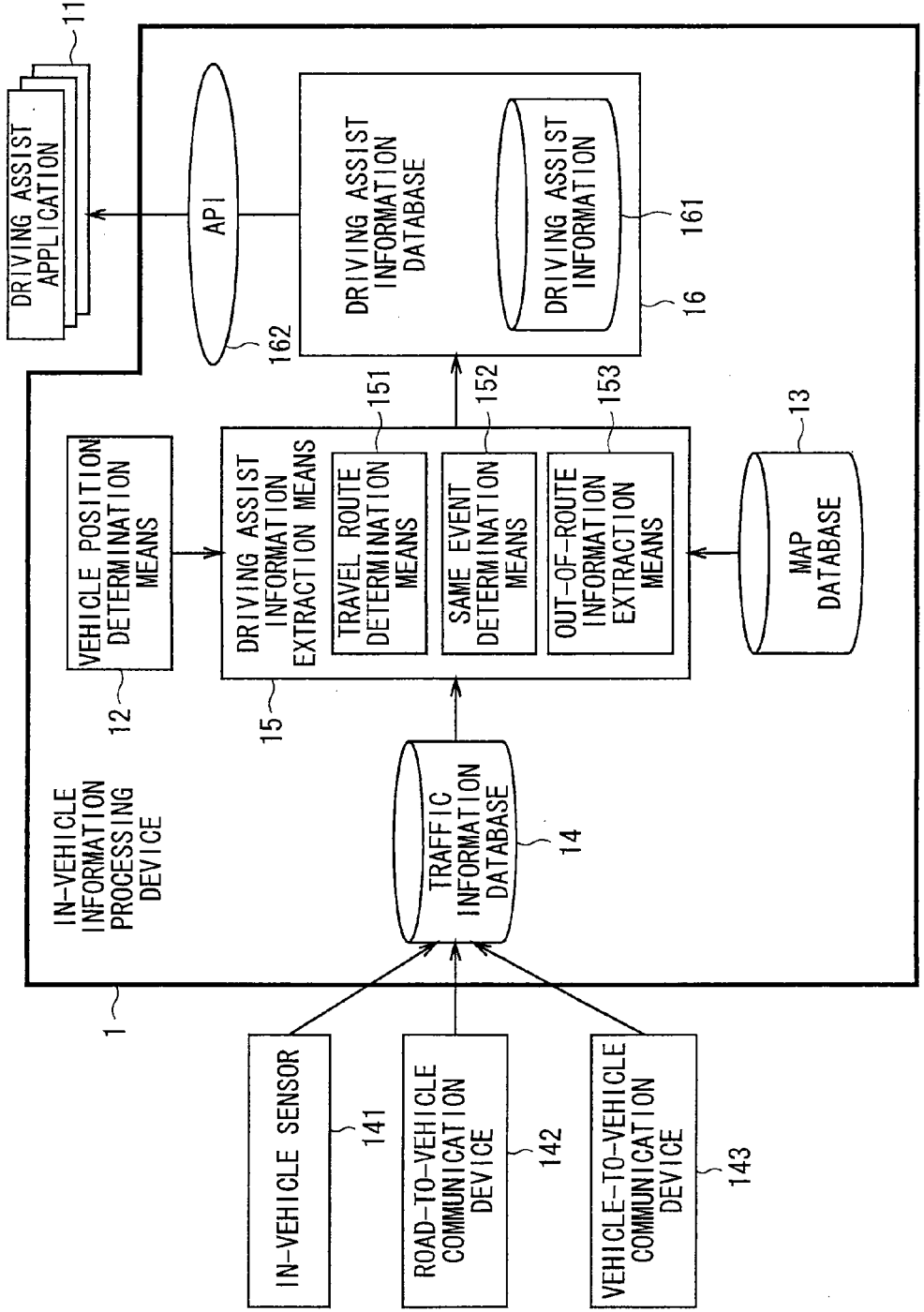
FIG. 1 A block diagram showing a configuration of an in-vehicle information processing device according to an embodiment 1 of the present invention.

<A-1. Configuration>
FIG. 1 is a block diagram showing a configuration of an in-vehicle information processing device according to an embodiment 1 of the present invention. An in-vehicle information processing device 1 of the present invention includes a traffic information database 14, vehicle position determination means 12, a map database 13, driving assist information extraction means 15, a driving assist information database 16, and an API 162. The traffic information database 14 obtains information from an in-vehicle sensor 141, a road-to-vehicle communication device 142, and a vehicle-to-vehicle communication device 143, and stores traffic information therein. The vehicle position determination means 12 calculates and determines a vehicle position. The map database 13 stores map information therein. The driving assist information extraction means 15 extracts driving assist information 161 from the traffic information stored in the traffic information database 14, the vehicle position determined by the vehicle position determination means 12, and the map information stored in the map database 13. The driving assist information database 16 stores therein the driving assist information 161 extracted by the driving assist information extraction means 15. The API 162 is an interface for receiving an output of the driving assist information database 16. The API 162 outputs the driving assist information 161 to one or more driving assist application 11. The driving assist application 11 can perform a driving assist having a predetermined content based on the driving assist information 161. Here, the traffic information means, among on-road information, dynamic information that is changeable over time such as a traffic congestion, a traffic control, a state of a traffic light, and the speed of an oncoming vehicle. The driving assist information 161 means map information, traffic information, and the like, that are necessary for operating the driving assist application 11 that aids traveling of the vehicle.

The driving assist information extraction means 15 includes travel route determination means 151 for determining a travel route based on the vehicle position, same event determination means 152 for determining the same event, and out-of-route information extraction means 153 for extracting information concerning the outside of the travel route.

The driving assist applications 11 are applications for aiding traveling of the vehicle, such as the Adaptive Cruise Control, the Adaptive Light Control, the Adaptive Speed Recommendation, the Fuel Consumption Optimization, or the like. The aid includes not only ones operated on a car navigation system such as providing information and calling attention but also ones operated on an external control system device connected to the car navigation system via a network, such as a headlight, an engine, and a transmission.

The vehicle position determination means 12 calculates and determines a position on a map in which the subject vehicle is traveling by using map matching and information from a GPS system, a gyroscope, and various sensors such as a vehicle speed sensor and a reverse sensor.

The map database 13 manages map information used in the applications such as the car navigation system. Here, the map information includes road information that is managed as a network structure made up of information of a node point such as an intersection point that is called a node and information of a road connecting nodes to each other that is called a road link. This road information includes information of a link length of each road link and an average travel time, and also includes information concerning an attribute of the location such as a speed limit, a traffic control, a gradient, and a curvature.

The traffic information database 14 obtains and collects real-time traffic information concerning the outside of the vehicle, such as a traffic light, a traffic congestion, a traffic control, and an obstruction, via the road-to-vehicle communication device 142 and the vehicle-to-vehicle communication device 143 using FM multiplex broadcasting, a road beacon, a satellite radio, a mobile phone, and the like, and the in-vehicle sensor 141 using a camera, a millimeter wave radar, and the like. The collected information is managed according to types of information and in association with the road link as position information.

The driving assist information extraction means 15 includes the travel route determination means 151 for determining a travel route on which the subject vehicle is expected to travel. Based on information of the travel route determined by the travel route determination means 151, only information concerning this travel route is extracted from the map information that is static information stored in the map database 13 and the traffic information that is dynamic information stored in the traffic information database 14.

Additionally, the driving assist information extraction means 15 includes the same event determination means 152. The driving assist information extraction means 15 determines whether or not the map information and the traffic information express the same event, and if it is determined that the same event is expressed, extracts data of only the traffic information. As a method for determining the sameness of the event, the determination is made based on the sameness of an event position and the sameness of an event type.

The driving assist information extraction means 15 includes the out-of-route information extraction means 153. The driving assist information extraction means 15 extracts, from information concerning the outside of the travel route, an event that can possibly reach the travel route within a predetermined time period, as information concerning that travel route.

Accordingly, not only the driving assist information 161 concerning the travel route but also the driving assist information 161 concerning the outside of the travel route that may reach the travel route within the predetermined time period is extracted. Therefore, for example, not only a road link on the travel route determined by the travel route determination means 151 but also a road link that is connected to an intersection point (connection point) existing within a predetermined distance (for example, 1 km) from the subject vehicle and that is also in a predetermined range (for example, 500 m) from the connection point, is obtained from the traffic information database 14.

Regarding the latter one of the above-mentioned examples of the road link, behaviors of events thereof are predicted, and information of only the event that can possibly reach the intersection point within the predetermined time period is extracted. The extracted driving assist information 161 is managed not as information of a location in the outside of the travel route where the event exists, but as information of the intersection point on the travel route. Examples of a method for determining the possibility of reaching the travel route include a method in which in a case where the extracted information concerns a traveling vehicle, it is assumed that the traveling vehicle moves (moves at a constant speed) at a speed of that point of time (the time point of the extraction), and then whether or not the traveling vehicle reaches the intersection point within the predetermined time period is determined.

The driving assist information database 16 is a database for managing all the driving assist information 161 commonly required for the driving assist applications 11. The driving assist information database 16 manages the driving assist information 161 extracted by the driving assist information extraction means 15, and provides it as the API 162 that is an interface shared by one or more driving assist applications 11. The driving assist information 161 managed by the driving assist information database 16 includes, together with the map information and the traffic information, information (a link number, a relative position on the link) indicating the location of information, freshness (which is ∞ in a case of the map information, and is an elapsed time after reception in a case of the traffic information), information indicating the type (such as a curve, a gradient, a traffic light, or an obstruction) of the information, and information (such as the magnitude of a curve, the magnitude of a gradient, the color and the remaining number of seconds of a traffic light, or the type and speed of an obstruction) indicating a content of the information. Each of these kinds of information is managed while being arranged in order of the distance from the travel vehicle position of the subject vehicle.

<A-2. Operation>
<A-2-1. Extraction Operation>

Next, by taking a situation shown in FIG. 2 as an example, an extraction operation of the driving assist information 161 of the in-vehicle information processing device 1 of the present invention will be described with reference to FIG. 4.

Figure 2:
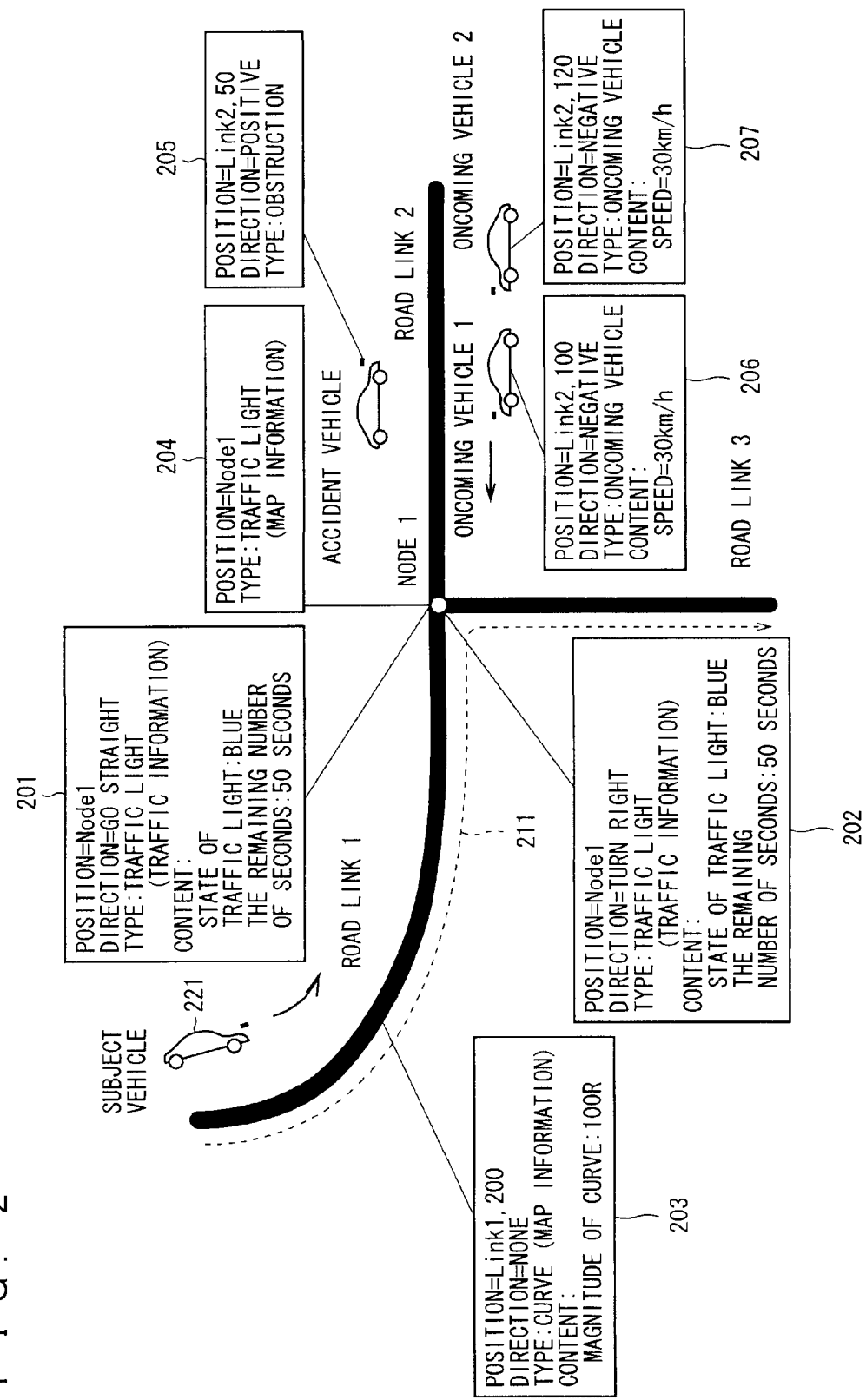
FIG. 2 An explanatory diagram showing a specific example of an operation of the in-vehicle information processing device according to the embodiment 1 of the present invention.

In a case shown in FIG. 2, a vehicle 221 travels along a route 211 on a road network having road links 1 to 3 and a node 1. Here, the route 211 is a route, such as a guide route, in which the traveling vehicle is most likely to travel. Each of map information 203 and 204 stored in the map database 13 and traffic information 201, 202, 205, and 206 stored in the traffic information database 14 indicates information at each location. FIG. 3 is a diagram showing a content of the information of the driving assist information database 16 (see FIG. 1) in the situation of FIG. 2.

Hereinafter, procedures for extracting only information on the route 211 will be described with reference to a flowchart shown in FIG. 4. In other words, a description will be given to an operation of determining a travel route and extracting driving assist information by the driving assist information extraction means 15.

Firstly, the travel route determination means 151 (see FIG. 1) of the driving assist information extraction means 15 determines the route 211 in which the vehicle is expected to travel (step S1-1). For the determination of the travel route by the travel route determination means 151, if there is route information calculated based on an input made by a driver, this information is used. If a route is not set in such a manner, a route in which the vehicle is more likely to travel is estimated based on a road attribute, travel history information, and the like. In this determination of the travel route, if the vehicle deviates from the route or if the travelable route is changed along with movement of the vehicle position, the travel route is re-calculated, and the processing of step S1-2 and subsequent steps is performed.

Next, a difference between a conventional route information stored as the driving assist information 161 in the driving assist information database 16 (see FIG. 1) and the travel route information calculated and determined (including the re-calculated one) in step S1-1 is calculated (step S1-2). In information of the difference, the information concerning the road link existing only in the driving assist information database 16, that is, the information existing only on the conventional route, is removed from the driving assist information 161 of the driving assist information database 16 (step S1-3). On the other hand, the road link existing only on the route 211 calculated and determined in step S1-1, that is, the information existing only on the route newly determined, is set as a road link to be extracted, and the following processing is performed thereon.

Then, in step S1-4, traffic information is obtained by inputting a string of the road link number and the node number to be newly extracted, which was obtained when the difference is calculated in step S1-2. In this case, only the information (traffic information 202 in FIG. 2) concerning a part of the route 211 in a traveling direction is extracted from the traffic information database 14. Then, new driving assist information 161 in which the relative position (a relationship of distance from a starting point of the route 211) on the route 211 is set as the position information is generated and stored in the driving assist information database 16. Here, the traffic information 202 is traffic information indicating the state (blue) of the traffic light, as shown in FIG. 2 and in the second row of a table shown in FIG. 3. The traffic information 202 indicates that it is positioned at a right-turn intersection, and that a remaining state holding time is 50 seconds.

In order that a distance between an event occurrence location and the subject vehicle can be easily determined, the driving assist information 161 managed by the driving assist information database 16 is expressed by, as position information thereof, a relative position originating from the starting point of the route 211. Alternatively, it may be expressed by a relative position on the road link relative to the road link number used in the map database 13.

Then, map information (information of the road link and the node) is obtained from the map database 13 by inputting a string of the road link number and the node number to be newly extracted, which was obtained when the difference is calculated in step S1-2 (step S1-5). From the obtained map information, the map information 203 indicating a curve having not less than a predetermined value and additionally the map information 204 considered to be necessary are extracted as information necessary for the driving assist. Then, new driving assist information 161 is generated in which the relative position on the route 211 is set as the position information. The map information 203 is map information indicating the magnitude of a curve as shown in FIG. 2 and in the first row of the table shown in FIG. 3. The map information 204 is map information indicating the traffic light at the node 1 as shown in FIG. 2.

Here, regarding the map information 204, information concerning the same event as that of the map information 204 has been already generated by the generation of the traffic information 202. Therefore, the map information 204 is not generated as the driving assist information 161. This is because it is generally assumed that the freshness and the level of detail of the information are higher in traffic information than in map information. The determination of whether or not the event is the same is made by the same event determination means 152 based on the sameness of the position information and the sameness of the information type. The extracted driving assist information 161 include not only the curve and the traffic light, but also, for example, a road shape such as a gradient, control information concerning a speed limit, a temporary stop, and the like, road infrastructure information concerning a tunnel, a sag, and the like.

Then, the out-of-route information extraction means 153 extracts traffic information concerning the outside of the travel route. Firstly, nodes existing on the road link within a predetermined distance (for example, 1 km) from the subject vehicle are obtained (step S1-6), and the following processing is repeatedly performed on all the nodes thus obtained (step S1-7). If the processing has been already performed on all the nodes obtained, the operation is terminated.

A processing object node is selected from the obtained nodes, and the road link number (for example, a road link 2 in FIG. 2) of the road link that is connected to the selected processing object node is inputted to thereby obtain traffic information 201, 205, 206, and 207 on the road from the traffic information database 14 (step S1-8). Here, the traffic information 201 is traffic information indicating the state (blue) of the traffic light as shown in FIG. 2, and indicates that it is positioned at a straight-through intersection and that a remaining state holding time is 50 seconds. The traffic information 205 is traffic information indicating an obstruction as shown in FIG. 2, and indicates that it is moving in a positive direction on the road link 2. The traffic information 206 is traffic information indicating an oncoming vehicle as shown in FIG. 2 in the third row of the table shown in FIG. 3, and indicates that it is moving in a negative direction on the road link 2 at a speed of 30 km per hour, and that a distance from the node 1 is 100 m. The traffic information 207 is traffic information indicating an oncoming vehicle as shown in FIG. 2, and indicates that it is moving in the negative direction on the road link 2 at a speed of 30 km per hour.

Herein, the road link number is inputted to obtain the traffic information. However, in a case where traffic information concerning the most proximate intersection point is separately managed in the traffic information database 14, it may be obtained without any condition.

Subsequently, the following processing is repeatedly performed on all the obtained traffic information according to the information types (step S1-9). If the processing on all the obtained traffic information has been already completed, the processing returns to step S1-7.

Under the assumption that the event indicated by the processing object traffic information is moving at a constant speed, whether or not the event will reach the selected node within a predetermined time period is calculated based on the speed of movement, a traveling direction, and a distance to the node (step S1-10). As a result of the calculation, the traffic information that will reach the selected node within the predetermined time period is extracted. Here, in the determination of whether or not the event will reach the selected node within the predetermined time period, it is assumed that the event is moving at a constant speed. However, for example, based on information of the traffic light of the node, the average speed of the road link, and the like, a model of reducing the speed at a certain rate of acceleration may be used in a case where the traffic light is red, or a model of increasing the speed may be used in a case where the average speed of the road link is higher. If traffic information that will reach the selected node within the predetermined time period does not exist, the processing returns to step S1-9.

Then, among the extracted traffic information, the traffic information having the shortest time period required for reaching is extracted (step S1-11). If the traffic information that will reach the selected node within the predetermined time period does not exist with respect to an information type, the processing on that information type is terminated, and the processing returns to step S1-9. Then, the same processing is performed on another information type. Here, the information type means a type of information indicating that it is information concerning the curve, the traffic light, or the oncoming vehicle, as shown in FIG. 3.

Based on the extracted traffic information, the driving assist information 161 indicating the position information that is the relative position of the selected node on the route 211, the speed of movement, and the distance to the node as the event, are generated and stored in the driving assist information database 16 (step S1-12).

<A-2-2. Operation in Updating>

Figure 5:
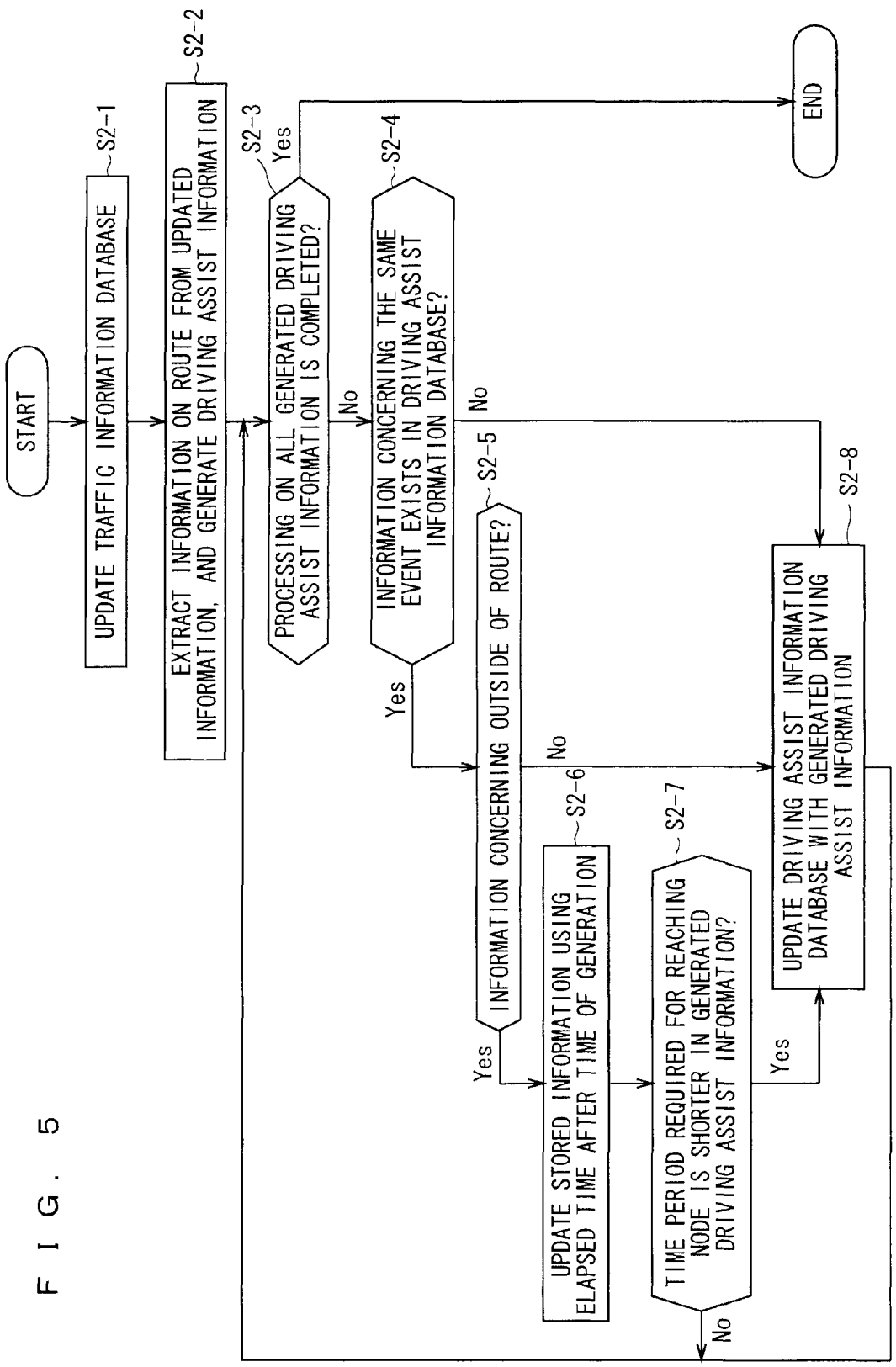
FIG. 5 A flowchart showing an operation of the driving assist information extraction means in a case where traffic information is updated in the in-vehicle information processing device according to the embodiment 1 of the present invention.

Next, an operation performed in a case where the information in the traffic information database 14, which is dynamic information, is updated, will be described with reference to FIG. 5.

Firstly, if the traffic information in the traffic information database 14 is updated (step S2-1), the driving assist information extraction means 15 determines whether or not information on the route 211 is included in the updated traffic information, and if the information on the route 211 is included, generates the driving assist information 161 based on the information (step S2-2). A method for the generation is the same as a method described in steps S1-4 to 1-10.

Then, the following processing is performed on all the generated driving assist information 161 (step S2-3). The same event determination means 152 determines whether or not driving assist information 161 concerning the same event exists in the driving assist information 161 already stored in the driving assist information database 16 (step S2-4). Here, the determination of whether or not the event is the same is made based on the sameness of the position and the sameness of the information type.

If the driving assist information 161 concerning the same event exists, the processing proceeds to step S2-5, and if it does not exist, updating is performed by adding the driving assist information 161 (step S2-8).

After the processing proceeds to step S2-5, whether or not that driving assist information 161 is information concerning the outside of the route 211 is determined (step S2-5), and if that driving assist information 161 is the information concerning the route 211, replaces that information with the newly generated driving assist information 161 (step S2-8).

If the information concerns the outside of the route 211, the out-of-route information extraction means 153 updates the driving assist information 161 by using speed information and an elapsed time after the generation of that information (step S2-6). If a time period required for reaching the node is shorter in the newly generated driving assist information 161 than in the already stored driving assist information 161 concerning the outside of the route 211 (step S2-7), the information is replaced with the newly generated driving assist information 161 (step S2-8). After updating the driving assist information 161, the processing returns to step S2-3. Here, in the update processing in step S2-6, the time required for reaching is calculated under the assumption that the event is moving at a constant speed. However, for example, based on information of the traffic light of the node, the average speed of the road link, and the like, a model of reducing the speed at a certain rate of acceleration may be used in a case where the traffic light is red, or a model of increasing the speed may be used in a case where the average speed of the road link is higher. If the time required for reaching the node is longer in the newly generated driving assist information 161 than in the already stored driving assist information 161 concerning the outside of the route 211 (step S2-7), the processing returns to step S2-3.

As described above, in the present invention, among events not existing on the objective route, an event that can possibly reach the objective route within a predetermined time period is shown as information concerning the intersection point (connection point) on the route. Thereby, all information necessary for the driving assist application 11 can be extracted, including information that is, at that point of time, not existing on a route in which the subject vehicle is expected to travel.

The out-of-route information is information that should basically be shown as driving assist information 161 on another route, but is shown as information in the connection point, that is, as information on the single route. This makes it unnecessary for the driving assist application 11 to consider the network structure of the road. Thus, the processing in the driving assist application 11 can be more efficient and simplified.

<A-3. Effects>

In the embodiment 1 of the present invention, the in-vehicle information processing device includes the map database 13 for storing the map information, the traffic information database 14 for storing the traffic information, the vehicle position determination means 12 for calculating and determining the vehicle travel position, the driving assist information extraction means 15 for extracting the driving assist information 161 from the map information stored in the map database 13 and the traffic information stored in the traffic information database 14, and the driving assist information database 16 for storing the driving assist information 161 extracted by the driving assist information extraction means 15. The driving assist information extraction means 15 has the travel route determination means 151 for determining the vehicle travel route based on the vehicle position determined by the vehicle position determination means 12. The driving assist information extraction means 15 extracts the driving assist information 161 from the map information and the traffic information concerning the vehicle travel route, and thereby can appropriately extract the driving assist information, thus efficiently processing it as the information on the travel route.

In the embodiment 1 of the present invention, in the in-vehicle information processing device, the driving assist information extraction means 15 further includes the out-of-route information extraction means 153 for extracting, from the traffic information concerning the outside of the vehicle travel route which is connected to the vehicle travel route via the connection point, the traffic information concerning the event that can possibly reach the vehicle travel route within the predetermined time period, as the driving assist information 161 in the connection point. Thereby, among the driving assist information 161 concerning the outside of the travel route, the one that can possibly reach the route within the predetermined time period can be appropriately extracted, and indicated as the driving assist information 161 on the travel route. Thus, information necessary for the driving assist application 11 can be efficiently processed.

In the embodiment 1 of the present invention, in the in-vehicle information processing device, the out-of-route information extraction means 153 extracts from the traffic information concerning the outside of the vehicle travel route which is connected to the vehicle travel route via the connection point, the traffic information that will reach the vehicle travel route within the predetermined time period if moving at the speed at that point of time, as the driving assist information 161 in the connection point. Thereby, from the driving assist information 161 concerning the outside of the travel route, the one that will reach the route within the predetermined time period can be appropriately extracted based on the speed of movement, and shown as the driving assist information 161 on the travel route. Thus, information necessary for the driving assist application 11 can be efficiently processed.

In the embodiment 1 of the present invention, in the in-vehicle information processing device, the driving assist information database 16 manages the driving assist information 161 in order of the distance between its corresponding location and the vehicle position, or in order of the distance from the starting point of the vehicle travel route. Thereby, the distance between the subject vehicle and the event can be accurately determined, and thus the driving assist information 161 can be efficiently processed.

B. Embodiment 2

<B-1. Configuration>

Figure 6:
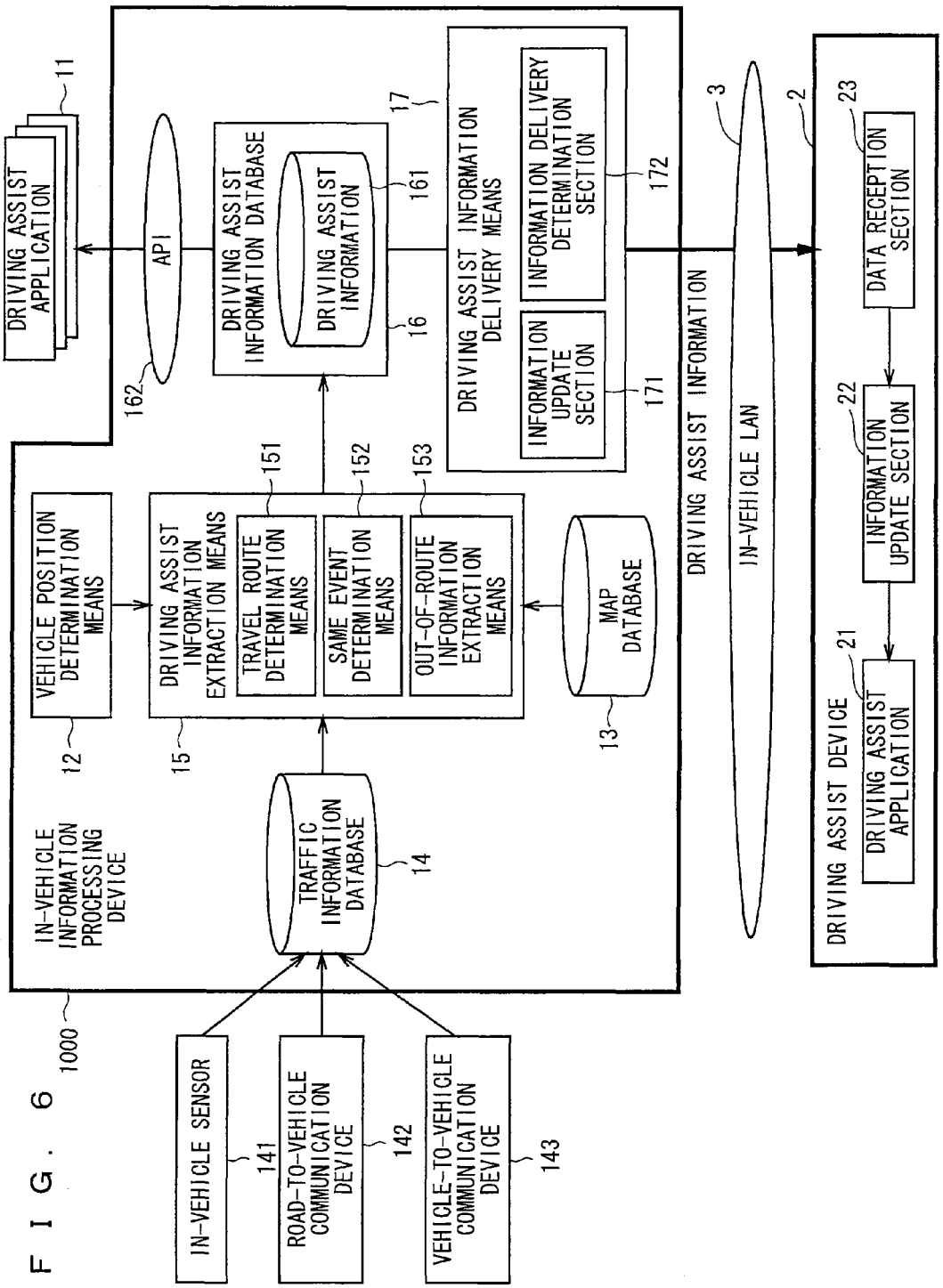
FIG. 6 A block diagram showing an in-vehicle information processing device according to an embodiment 2 of the present invention.

FIG. 6 is a block diagram showing a configuration of an in-vehicle information processing device 1000 according to an embodiment 2 of the present invention. The in-vehicle information processing device 1000 of the present invention includes, in addition to the configuration of the embodiment 1 shown in FIG. 1, driving assist information delivery means 17, an information update section 171 provided in the driving assist information delivery means 17, and an information delivery determination section 172 provided in the driving assist information delivery means 17. The driving assist information delivery means 17 receives an output of the driving assist information database 16. The information update section 171 updates the delivered information based on an elapsed time from a time of generation thereof. The information delivery determination section 172 delivers the driving assist information 161 updated by the information update section 171. The in-vehicle information processing device 1000 delivers, via an in-vehicle LAN 3, the driving assist information 161 from the driving assist information delivery means 17 to another driving assist device 2. The other parts of the configuration are the same as those shown in the embodiment 1, and therefore descriptions thereof will be omitted.

The driving assist device 2 receives, at a data reception section 23, delivery from the driving assist information delivery means 17, and causes, via an information update section 22, the driving assist application 21 to function.

<B-2. Operation>

Figure 7:
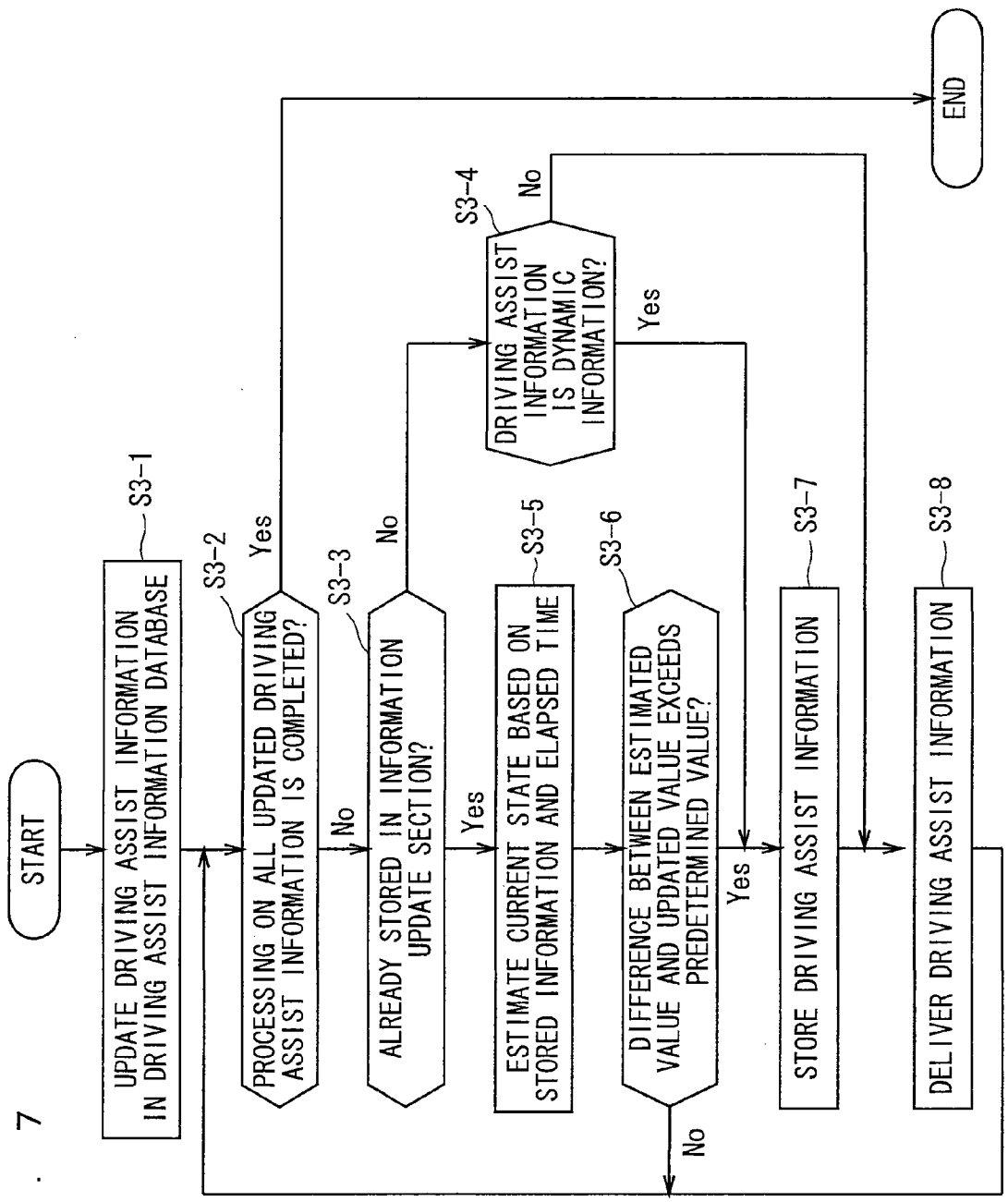
FIG. 7 A flowchart showing an operation of driving assist information delivery means of the in-vehicle information processing device according to the embodiment 2 of the present invention.

Next, a delivery operation of the driving assist information 161 according to the embodiment 2 of the present invention will be described with reference to a flowchart of FIG. 7.

Firstly, the driving assist information 161 stored in the driving assist information database 16 is updated (step S3-1). Then, the following processing is performed on all the updated driving assist information 161 (step S3-2).

Firstly, whether or not the updated driving assist information 161 is stored in the information update section 171 is determined (step S3-3).

If it is not stored, whether or not the driving assist information 161 is dynamic information is determined (step S3-4). If the driving assist information 161 includes information that dynamically changes whose change over time can be estimated, this driving assist information 161 is stored in the information update section 171 (step S3-7), while if the driving assist information 161 does not include such information, nothing is performed. Then, the information delivery determination section 172 delivers the driving assist information 161 to the in-vehicle LAN 3 (step S3-8). Here, examples of the information whose change over time can be estimated include the speed of movement and schedule information. It may be acceptable that a threshold value which will be described later is attached to the driving assist information 161 to be delivered. This threshold value may dynamically change in accordance with a network load of the in-vehicle LAN 3.

On the other hand, if it is stored, the information update section 171 serving as a first information estimation section outputs, to the information delivery determination section 172, first estimated driving assist information obtained by estimating a current state (after updating) of the stored information based on an elapsed time from the delivery (step S3-5). Here, as an estimation method, there can be mentioned a method in which if the information includes the speed of movement of the event, the calculation is performed under an assumption that the event moves at a constant speed or at a constant rate of acceleration.

Then, the information delivery determination section 172 obtains a difference between updated actual data obtained from the driving assist information database 16 and the first estimated driving assist information estimated in step S3-5 (step S3-6). If the obtained difference exceeds a predetermined value that is predefined for each information type, the information delivery determination section 172 updates the driving assist information 161 stored in the information update section 171 by using the data obtained from the driving assist information database 16 (step S3-7), and delivers the updated driving assist information 161 to the in-vehicle LAN 3 (step S3-8). On the other hand, if the obtained difference does not exceed the predefined predetermined value, nothing is performed and the processing returns to step S3-2 to perform the processing on the next driving assist information 161.

On the other hand, the driving assist device 2 connected to the in-vehicle information processing device 1 via the in-vehicle LAN 3 includes a data reception section 23, the information update section 22 serving as a second information estimation section, and the driving assist application 21 serving as driving assist execution means. The data reception section 23 receives the delivered driving assist information 161. The information update section 22 estimates a change of the received driving assist information 161 based on an elapsed time from a reception time, and outputs an estimation result as second estimated driving assist information. The driving assist application 21 performs a driving assist having a predetermined content for aiding traveling of the vehicle, based on the second estimated driving assist information.

The driving assist application 21 performs an application process using the second estimated driving assist information obtained as a result of the estimation made by the information update section 22, instead of using the received driving assist information 161 without any change performed thereon. The information update section 22 of the driving assist device 2 performs a process for estimating updated data, in a method equivalent to the method performed by the information update section 171 of the in-vehicle information processing device 1. As a method for making the estimation methods of the in-vehicle information processing device 1 and the driving assist device 2 equivalent to each other, an estimation method may be preliminarily determined for each information type, or alternatively an identifier for identifying an estimation method may be given to the delivered driving assist information 161 so that the estimation method can be shared. The estimation process may be performed at different timings in the in-vehicle information processing device 1 and in the driving assist device 2.

As described above, in the embodiment 2 of the present invention, the in-vehicle information processing device 1 that is a transmitter and the driving assist device 2 that is a receiver estimate data by using the same method, and only if the difference between the estimation result and the actual data exceeds the predetermined value, the information delivery determination section 172 of the driving assist information delivery means 17 delivers the driving assist information 161. Therefore, while the difference between the estimation result and the actual data falls within a predetermined range, the in-vehicle information processing device 1 does not deliver the driving assist information 161. Thus, even if information is frequently updated, the amount of actually delivered data can be reduced, which can consequently ensure the real-time property in communications.

<B-3. Effects>

In the embodiment 2 of the present invention, the in-vehicle information processing device further includes the driving assist information delivery means 17 that can deliver the updated version of the driving assist information 161 in the driving assist information database 16. This enables another driving assist device 2 to operate the driving assist application 21 based on the driving assist information 161.

In the embodiment 2 of the present invention, in the in-vehicle information processing device, the driving assist information delivery means 17 includes the information update section 171 serving as the first information estimation section and the information delivery determination section 172. The information update section 171 estimates a change of the driving assist information 161 resulting from updating, and outputs an estimation result as the first estimated driving assist information. If the difference between the first estimated driving assist information and newly updated driving assist information 161 exceeds the predetermined value, the information delivery determination section 172 delivers the newly updated driving assist information 161. Thereby, the in-vehicle information processing device 1 does not deliver the driving assist information 161 unless the difference exceeds the predetermined value. Thus, even if information is frequently updated, the amount of actually delivered data can be reduced, which can consequently ensure the real-time property in communications.

In the embodiment 2 of the present invention, in a case where the above-described in-vehicle information processing device 1 includes the driving assist information delivery means 17, the driving assist device includes the data reception section 23, the information update section 22 serving as the second information estimation section, and the driving assist application 21 serving as the driving assist execution means. The data reception section 23 receives the delivered driving assist information 161. The information update section 22 estimates a change of the delivered driving assist information 161, and outputs an estimation result as the second estimated driving assist information. The driving assist application 21 performs a driving assist having a predetermined content for aiding traveling of the vehicle, based on the second estimated driving assist information. Thereby, even if the delivery from the in-vehicle information processing device 1 occurs only in a predetermined case, the driving assist device 2 generates the second estimated driving assist information using the same method as the in-vehicle information processing device 1, and therefore the amount of delivered data can be reduced, thus making it easy to ensure the real-time property in communications.

C. Embodiment 3

<C-1. Configuration>

Figure 8:
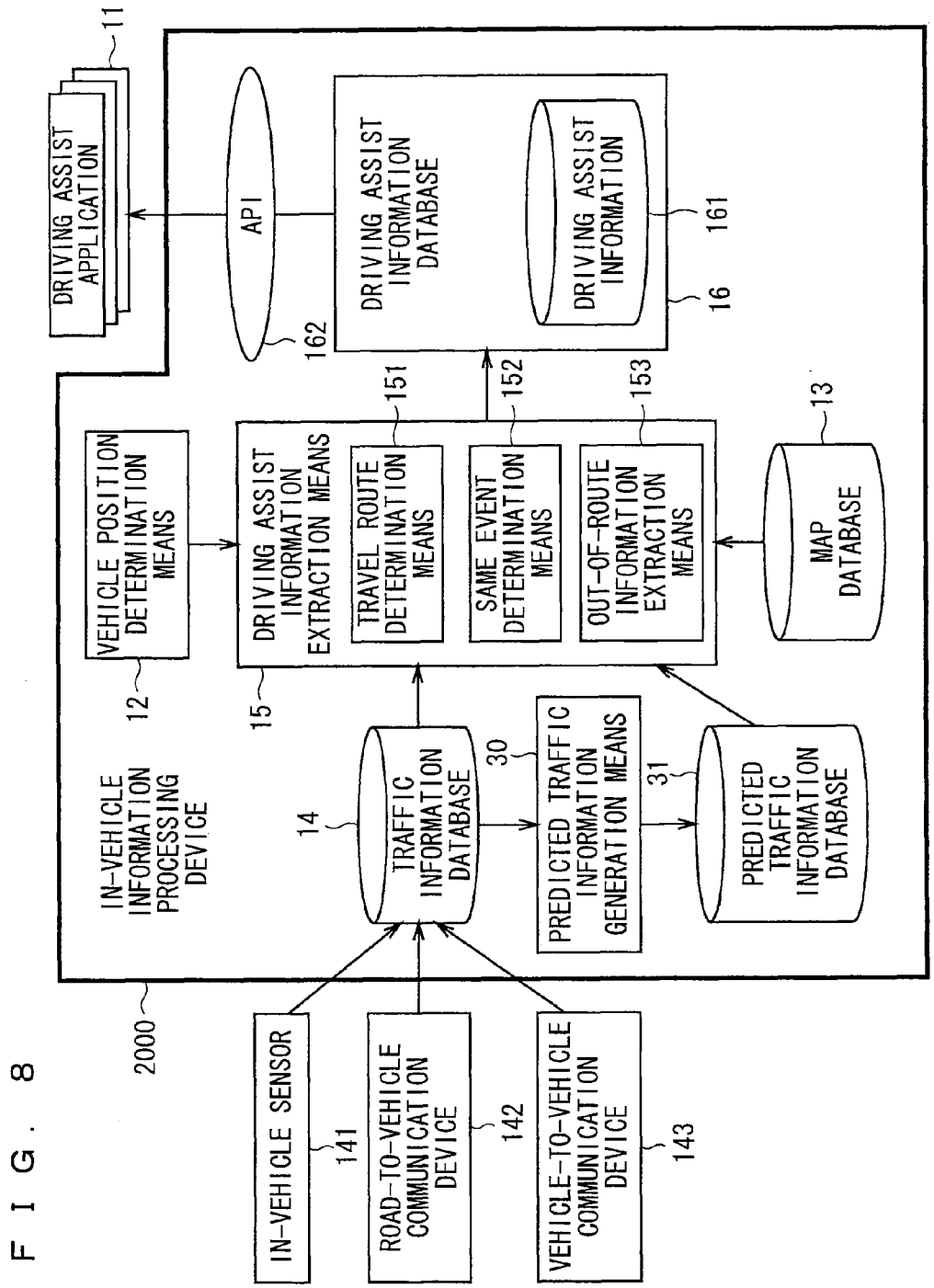
FIG. 8 A block diagram showing a configuration of an in-vehicle information processing device according to an embodiment 3 of the present invention.

FIG. 8 is a block diagram showing a configuration of an in-vehicle information processing device 2000 according to an embodiment 3 of the present invention. The in-vehicle information processing device 2000 of the present invention includes, in addition to the configuration of the embodiment 1 shown in FIG. 1, predicted traffic information generation means 30 for generating predicted traffic information about a future of a predetermined time period later, based on the traffic information stored in the traffic information database 14 and then accumulating the predicted traffic information in a predicted traffic information database 31. The driving assist information extraction means 15 is configured to extract the predicted traffic information from the predicted traffic information database 31 in addition to the map database 13 and the traffic information database 14. The other parts of the configuration are the same as those shown in the embodiment 1, and therefore detailed descriptions thereof will be omitted.

<C-2. Operation>

Next, a description will be given to operations of generating, updating, and extracting predicted traffic information in the predicted traffic information database 31 according to the embodiment 3 of the present invention.

In the operations of generating and updating the predicted traffic information by the predicted traffic information generation means 30, traffic information available as predicted traffic information concerning a future traffic situation, such as the traffic light information and the traffic congestion information, is extracted at a time of updating the traffic information stored in the traffic information database 14. Then, predetermined processing is performed on the extracted traffic information. In a case where the extracted traffic information is traffic congestion information, for example, a process disclosed in Japanese Patent No. 4177228 is performed to thereby generate predicted traffic congestion information (such as a link travel time and the degree of traffic congestion) as the predicted traffic information. In a case where the extracted traffic information is traffic light information, a traffic light schedule (predict traffic light information serving as the predicted traffic information) connected to an absolute time is generated. Moreover, the predicted traffic information generation means 30 stores these information into the predicted traffic information database 31. The predicted traffic information stored in the predicted traffic information database 31 is occasionally updated based on the traffic information stored in the traffic information database 14.

At this time, the information is converted into a form that can be represented as absolute coordinates and stored in the form. For example, as coordinates representing the location of the information, the coordinates equivalent to those of the map database 13 may be used.

Figure 4:
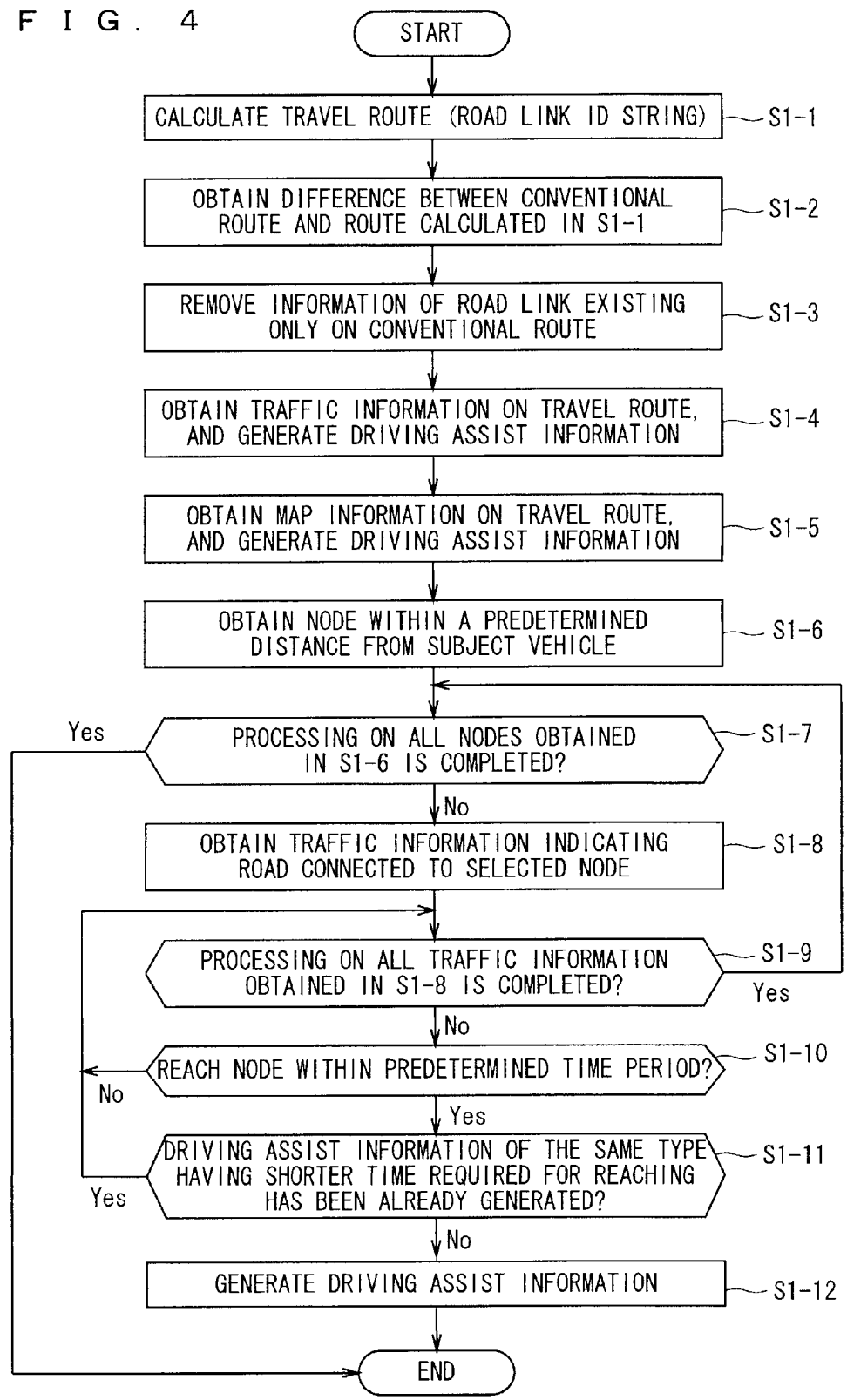
FIG. 4 A flowchart showing an operation of driving assist information extraction means of the in-vehicle information processing device according to the embodiment 1 of the present invention.

In the extraction operation of the driving assist information extraction means 15, after the traffic information is obtained in S1-4 of the flowchart of FIG. 4, predicted traffic information on the travel route is obtained from the predicted traffic information database 31, to generate the driving assist information 161. At this time, for example, if the information concerning the same event has been already generated in the generation of the traffic information 202, the generation of the predicted traffic information as the driving assist information 161 is not performed.

The other operations are the same as those shown in the embodiment 1, and therefore detailed descriptions will be omitted.

Figure 9:
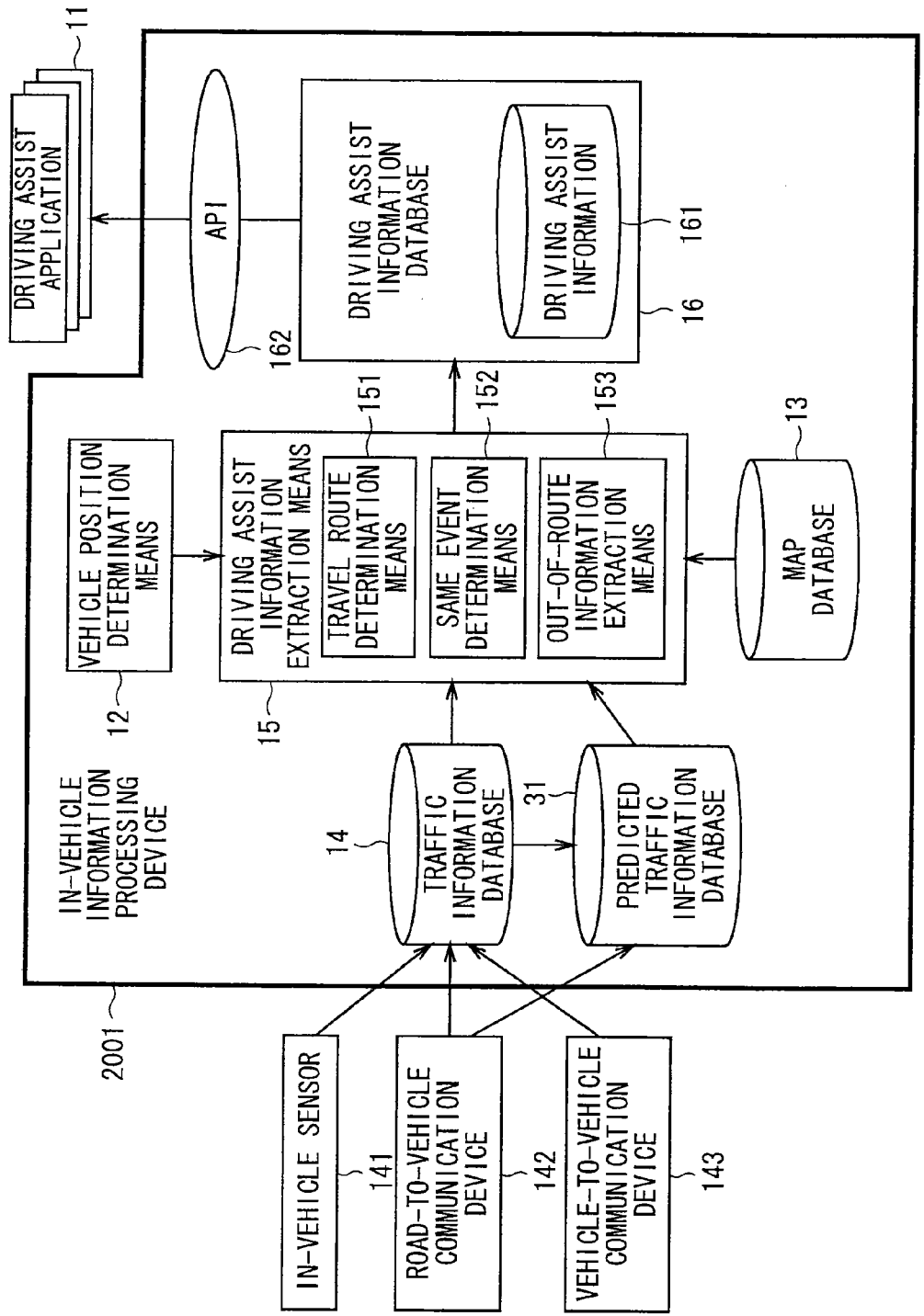
FIG. 9 A block diagram showing a configuration of an in-vehicle information processing device according to the embodiment 3 of the present invention.

In the case shown in this embodiment 3, the predicted traffic information generation means 30 generates the predicted traffic information. However, the predicted traffic information may be preliminarily stored in the predicted traffic information database 31, or alternatively may be directly obtained by communication using the road-to-vehicle communication device 142, as in an in-vehicle information processing device 2001 shown in FIG. 9.

<C-3. Effects>

In the embodiment 3 of the present invention, the in-vehicle information processing device further includes the predicted traffic information generation means 30 and the predicted traffic information database 31. The predicted traffic information generation means 30 generates the predicted traffic information about the future of the predetermined time period later, based on the traffic information stored in the traffic information database. The predicted traffic information database 31 stores the predicted traffic information predicted by the predicted traffic information generation means 30. The driving assist information extraction means 15 extracts the driving assist information 161 from the predicted traffic information in addition to the map information and the traffic information, and uses them as the driving assist information. Thereby, even if traffic information cannot be obtained from communication or sensors, a driving assist can be performed by using the predicted traffic information.

In the embodiment 3 of the present invention, in the in-vehicle information processing device, the predicted traffic information generation means 30 updates the predicted traffic information in the predicted traffic information database 31 based on the traffic information stored in the traffic information database 14. Thereby, an appropriate driving assist can be performed by using latest information as need arises.

In the embodiment 3 of the present invention, in the in-vehicle information processing device, the predicted traffic information database 31 directly obtains the predicted traffic information from the external road-to-vehicle communication device 142, and stores it therein. Thereby, the information can be directly obtained without the need to generate the predicted traffic information using the predicted traffic information generation means 30.

While the invention has been described in detail, the foregoing description is in all aspects illustrative and not restrictive. It is therefore understood that numerous modifications and variations can be devised without departing from the scope of the invention.

DESCRIPTION OF THE REFERENCE NUMERALS

1, 1000, 2000, 2001 in-vehicle information processing device; 2 driving assist device; 3 in-vehicle LAN; 11, 21 driving assist application; 12 vehicle position determination means; 13 map database; 14 traffic information database; 15 driving assist information extraction means; 16 driving assist information database; 17 driving assist information delivery means; 22, 171 information update section; 23 data reception section; 30 predicted traffic information generation means; 31 predicted traffic information database; 141 in-vehicle sensor; 142 road-to-vehicle communication device; 143 vehicle-to-vehicle communication device; 151 travel route determination means; 152 same event determination means; 153 out-of-route information extraction means; 161 driving assist information; 172 information delivery determination section; 201, 202, 205 to 207 traffic information; 203, 204 map information; 211 route; 221 vehicle.

The invention claimed is:

1. An in-vehicle information processing device comprising:
 a map database for storing map information;
 a traffic information database for storing traffic information;
 vehicle position determination means for calculating and determining a vehicle position;
 driving assist information extraction means for extracting driving assist information from said map information stored in said map database and said traffic information stored in said traffic information database; and a driving assist information database for storing said driving assist information extracted by said driving assist information extraction means, wherein said driving assist information extraction means includes travel route determination means for determining a vehicle travel route for said vehicle based on said vehicle position determined by said vehicle position determination means, and said driving assist information extraction means includes same event determination means for determining whether or not said map information and said traffic information express a same driving event, and when said same event determination means determines that a same driving event is not expressed, said driving assist information extraction means subsequently extracts from said driving assist information stored in said driving assist information database, said driving assist information from said map information and said traffic information for said vehicle travel route, and when said same event determination means determines that the same driving event is expressed, said driving assist information extraction means subsequently extracts said driving assist information only from said traffic information for said vehicle travel route;

and further comprising:

an out-of-route information extraction means for extracting, from said traffic information concerning a further vehicle travel route which is connected to said vehicle travel route via a connection point, said traffic information concerning a driving event that will reach said vehicle travel route within a predetermined time period if moving at a speed at that point of time, as said driving assist information in said connection point.

2. The in-vehicle information processing device according to claim 1, wherein said driving assist information database manages said driving assist information in order of a distance between a corresponding location thereof and said vehicle position, or in order of a distance from a starting point of said vehicle travel route.

3. The in-vehicle information processing device according to claim 1, further comprising driving assist information delivery means configured to deliver an updated version of said driving assist information in said driving assist information database.

4. The in-vehicle information processing device according to claim 3, wherein said driving assist information delivery means comprises:
a first information estimation section for estimating a change of said driving assist information resulting from updating, and outputting an estimation result as first estimated driving assist information; and
an information delivery determination section for, if a difference between said first estimated driving assist information and a newly updated version of said driving assist information exceeds a predetermined value, delivering said updated version of said driving assist information.

5. A driving assist device comprising:

a data reception section for receiving said driving assist information delivered from said driving assist information delivery means according to claim 3;

a second information estimation section for estimating a change of said delivered driving assist information, and outputting an estimation result as second estimated driving assist information; and driving assist execution means for performing a driving assist having a predetermined content for aiding traveling of said vehicle, based on said second estimated driving assist information.

6. The in-vehicle information processing device according to claim 1, further comprising:

predicted traffic information generation means for generating predicted traffic information about a future of a predetermined time period later, based on said traffic information stored in said traffic information database; and a predicted traffic information database for storing said predicted traffic information predicted by said predicted traffic information generation means, wherein said driving assist information extraction means extracts said driving assist information from said predicted traffic information in addition to said map information and said traffic information.

7. The in-vehicle information processing device according to claim 6, wherein said predicted traffic information generation means updates said predicted traffic information in said predicted traffic information database based on said traffic information stored in said traffic information database.

8. The in-vehicle information processing device according to claim 6, wherein said predicted traffic information database obtains said predicted traffic information directly from an external road-to-vehicle communication device, and stores it therein.

* * * * *

UNITED STATES PATENT AND TRADEMARK OFFICE
CERTIFICATE OF CORRECTION

PATENT NO. : 9,291,471 B2
APPLICATION NO. : 13/502604
DATED : March 22, 2016
INVENTOR(S) : Masahiko Ikawa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this
Second Day of August, 2016

Michelle K. Lee
*Director of the United States Patent and Trademark Office*